US010920473B2

(12) United States Patent
Yamagata et al.

(10) Patent No.: US 10,920,473 B2
(45) Date of Patent: Feb. 16, 2021

(54) VEHICLE DOOR OPENING/CLOSING APPARATUS

(71) Applicant: U-Shin Ltd., Tokyo (JP)

(72) Inventors: Mikio Yamagata, Hiroshima (JP); Hideaki Nagata, Hiroshima (JP)

(73) Assignee: U-SHIN LTD., Tokyo (JP)

( * ) Notice: Subject to any disclaimer, the term of this patent is extended or adjusted under 35 U.S.C. 154(b) by 136 days.

(21) Appl. No.: 16/321,094

(22) PCT Filed: Jul. 25, 2017

(86) PCT No.: PCT/JP2017/026921
§ 371 (c)(1),
(2) Date: Jan. 28, 2019

(87) PCT Pub. No.: WO2018/025708
PCT Pub. Date: Feb. 8, 2018

(65) Prior Publication Data
US 2019/0169901 A1 Jun. 6, 2019

(30) Foreign Application Priority Data
Aug. 5, 2016 (JP) .................................. 2016-154282

(51) Int. Cl.
*B62D 25/00* (2006.01)
*E05F 1/04* (2006.01)
(Continued)

(52) U.S. Cl.
CPC .................. *E05F 1/04* (2013.01); *B60J 5/10* (2013.01); *E05C 17/30* (2013.01); *E05F 3/16* (2013.01);
(Continued)

(58) Field of Classification Search
CPC ......... E05F 1/04; E05F 15/622; E05C 17/30; B60J 15/04; B60J 5/10; B60J 5/101; E05Y 2900/546; E05Y 2900/532
(Continued)

(56) References Cited

U.S. PATENT DOCUMENTS 3,885,778 A * 5/1975 Deisenroth ............... F16F 3/04
267/71
4,512,600 A * 4/1985 King ..................... E05F 1/1058
292/338
(Continued)

FOREIGN PATENT DOCUMENTS

DE 102008062400 A1 6/2010
JP 2005-536373 A 12/2001
(Continued)

OTHER PUBLICATIONS

Japanese "Notice of Reasons for Refusal" dated Mar. 24, 2020 for Japanese Patent Application No. 2016-154282 filed on Aug. 5, 2016 and its English machine translation.

*Primary Examiner* — Jerry E Redman
(74) *Attorney, Agent, or Firm* — BainwoodHuang (57) ABSTRACT

The present invention prevents or suppresses a grommet from detaching from a ball socket. The grommet that has a cover for covering a harness led and extended outside a cap of the ball socket is configured by including a boot part that covers the harness inside the cap and that is formed into a bottomed cylindrical shape opened to an electric motor side, a connection cylindrical part that is disposed inside a harness insertion hole that connects the boot part and the cover and in which the harness is inserted, and a falling-out prevention part that is formed in the boot part that engages the cap and that restricts the movement of the boot part toward the harness insertion hole side.

4 Claims, 8 Drawing Sheets

(51) Int. Cl.
 *E05F 15/622* (2015.01)
 *E05C 17/30* (2006.01)
 *B60J 5/10* (2006.01)
 *E05F 3/16* (2006.01)

(52) U.S. Cl.
 CPC ............. *E05F 15/622* (2015.01); *B60J 5/101* (2013.01); *E05Y 2900/532* (2013.01); *E05Y 2900/546* (2013.01)

(58) Field of Classification Search
 USPC .......................................................... 296/56
 See application file for complete search history.

(56) References Cited

U.S. PATENT DOCUMENTS

| | | | | |
|---|---|---|---|---|
| 7,506,556 B2 * | 3/2009 | Ritter | .................... | E05F 15/627 296/56 |
| 7,566,092 B2 * | 7/2009 | Paton | ....................... | B60J 5/101 296/106 |
| 7,665,794 B2 * | 2/2010 | Kachouh | ............... | E05F 15/622 296/146.3 |
| 7,695,041 B2 * | 4/2010 | Reed | ....................... | B62K 5/01 296/37.1 |
| 8,136,861 B2 * | 3/2012 | Rajon | .................... | E05F 5/022 296/56 |
| 8,635,757 B2 * | 1/2014 | Bartsch | ................. | E05F 1/1238 29/525.01 |

FOREIGN PATENT DOCUMENTS

| JP | 2014101637 A | 6/2014 |
|---|---|---|
| JP | 2016141956 | 8/2016 |
| JP | 2016141956 A | 8/2016 |

* cited by examiner

VEHICLE DOOR OPENING/CLOSING APPARATUS

TECHNICAL FIELD

The present invention relates to a vehicle door opening/closing apparatus.

BACKGROUND ART

There are vehicle door opening/closing apparatuses having an extendable and contractible shaft shape and including a support member interposed between a body and a door of a vehicle so as to enable the door to be retained in an open position. In such a vehicle door opening/closing apparatus, each axial direction end portion of the support member is normally coupled to the door or the body so as to be capable of pivoting. The vehicle door can be moved so as to open or close by the support member extending or contracting while relatively pivoting about the pivot-coupling points.

For example, Patent Document 1 discloses a vehicle door opening/closing apparatus in which a support member includes an electric motor to generate drive force electrically, a first housing including a gear mechanism or the like to reduce the revolution speed of the electric motor, a threaded spindle driven by the motor, and a spindle nut screwed together with the threaded spindle. The apparatus further includes a first guide pipe that is moved in an axial direction by rotation of the threaded spindle, and a second housing that is disposed coaxially with the first guide pipe and that houses a second guide pipe in which a spring to bias the first guide pipe in the axial direction is housed. The second housing is structured so as to be capable of extending and contracting with respect to the first housing.

Figure 7:
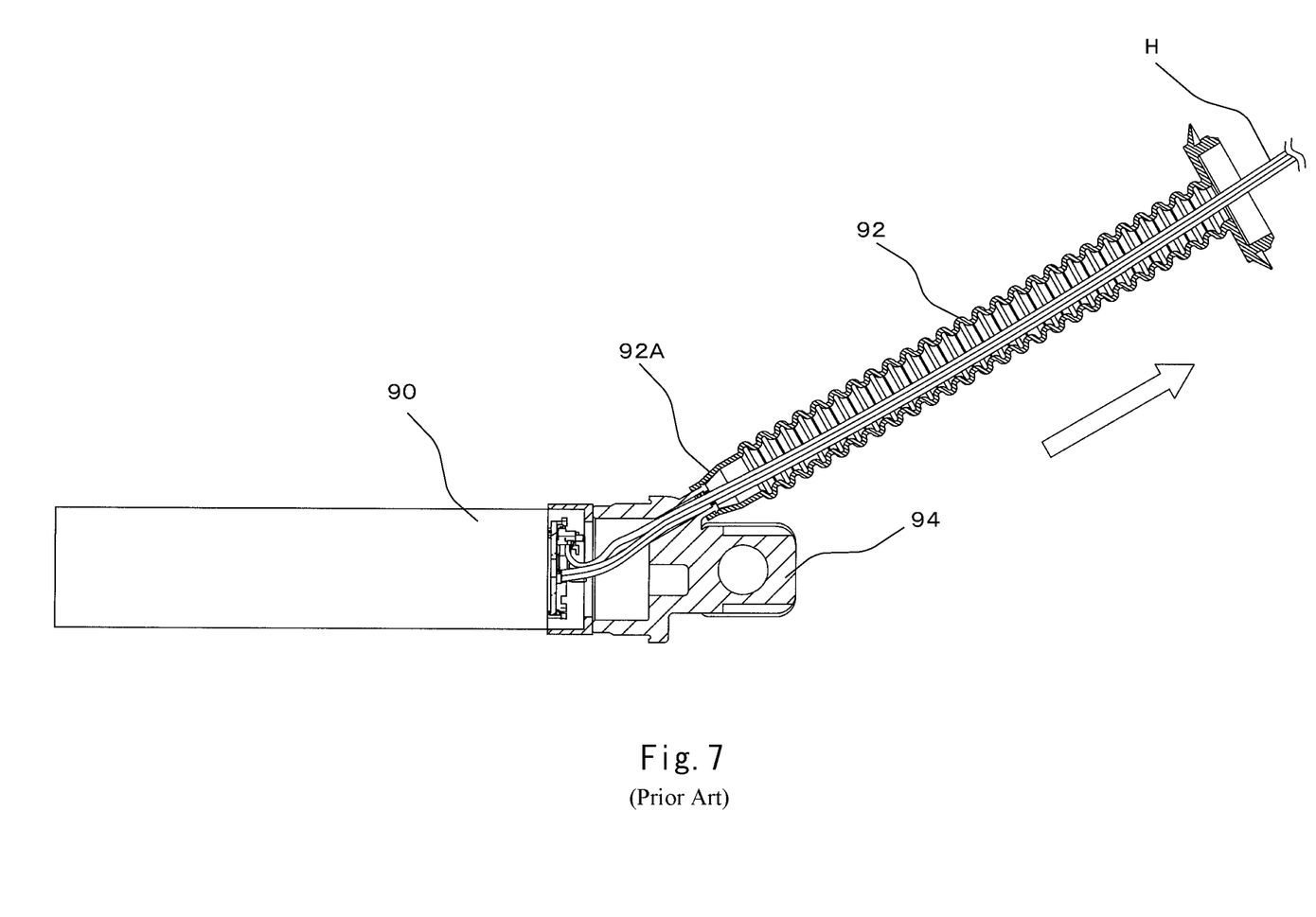
FIG. 7 is an explanatory diagram to explain a conventional example.

A ring shaped packing is arranged in a vehicle door opening/closing apparatus such as that described in Patent Document 1 in order to waterproof the motor side. A portion of the vehicle door opening/closing apparatus where a harness connected to the motor is led out sometimes has a structure covered by a grommet in order to secure waterproofing. Specifically, as illustrated in FIG. 7, a tube shaped lead-out portion of a ball socket 94 is press fitted into a leading end portion 92A of a grommet 92 covering a harness H connected to a motor 90 an order to secure sealing properties between the ball socket 94 and the grommet 92.

PATENT DOCUMENTS

Patent Document 1: Japanese Patent Application Laid-Open No. 2014-101637

SUMMARY OF INVENTION

Technical Problem

However, in the structure illustrated in FIG. 7 described above, the leading end portion 92A of the grommet 92 might detach from the ball socket 94 if, for example, the grommet 92 is pulled in the direction of the arrow in FIG. 7 during an operation to attach the vehicle door opening/closing apparatus to a vehicle.

In consideration of the above circumstances, the present invention provides a vehicle door opening/closing apparatus capable of preventing or suppressing a grommet from detaching from a ball socket.

Solution to Problem

First Aspect: One or more exemplary embodiments of the present invention provides a vehicle door opening/closing apparatus including: a tube shaped first housing for housing an electric motor drive mechanism inside; a second housing that is disposed coaxially with the first housing, and that is moved in an axial direction relative to the first housing by a spindle drive mechanism connected to the electric motor drive mechanism; a ball socket that includes a cap having a bottomed-tube shape for insertion into an opening on one end side of the first housing to block off the opening, and the ball socket also including a harness insertion hole formed in a bottom portion of the cap to allow a harness connected to an electric motor to be led out; and a grommet that includes a cover portion extending outside the cap and covering the harness where it has been led out of the cap, in which the grommet includes a boot portion formed in a bottomed-tube shape opening toward the electric motor side and covering the harness inside the cap, a coupling tube portion disposed inside the harness insertion hole so as to couple the boot portion and the cover portion together, with the harness inserted through the inside of the coupling tube portion, and a detachment prevention section formed to the boot portion for engaging with the cap to limit movement of the boot portion toward the harness insertion hole side.

Second Aspect: One or more exemplary embodiments of the present invention provides the vehicle door opening/closing apparatus in which the detachment prevention section includes: a retainer portion that extends from an opening end portion of the boot portion toward a radial direction outside so as to be disposed between an opening end face of the cap and the electric motor; and a packing portion that extends from a radial direction outside end portion of the retainer portion toward a bottom wall side of the boot portion so as to be sandwiched between the first housing and the cap.

Third Aspect: One or more exemplary embodiments of the present invention provides the vehicle door opening/closing apparatus in which the ball socket is configured from a resin colored so as to absorb a laser; the first housing is configured from a resin colored so as to allow the laser to pass through without absorbing the laser; and a fitting portion where the ball socket and the first housing are fitted together is bonded by laser welding around the entire circumference of the fitting portion.

Fourth Aspect: One or more exemplary embodiments of the present invention provides the vehicle door opening/closing apparatus in which a motor retainer is disposed on the electric motor; and the detachment prevention section is sandwiched between the motor retainer and an opening end face of the cap.

Advantageous Effects of Invention

One or more exemplary embodiments of the present invention exhibit an advantageous effect of being capable of preventing or suppressing a grommet from detaching from a ball socket.

DESCRIPTION OF EMBODIMENTS

Explanation follows regarding a vehicle door opening/closing apparatus 1 (referred to hereafter simply as the "door opening/closing apparatus 1") according to an exemplary embodiment, with reference to the drawings.

Exemplary Embodiment

Figure 1:
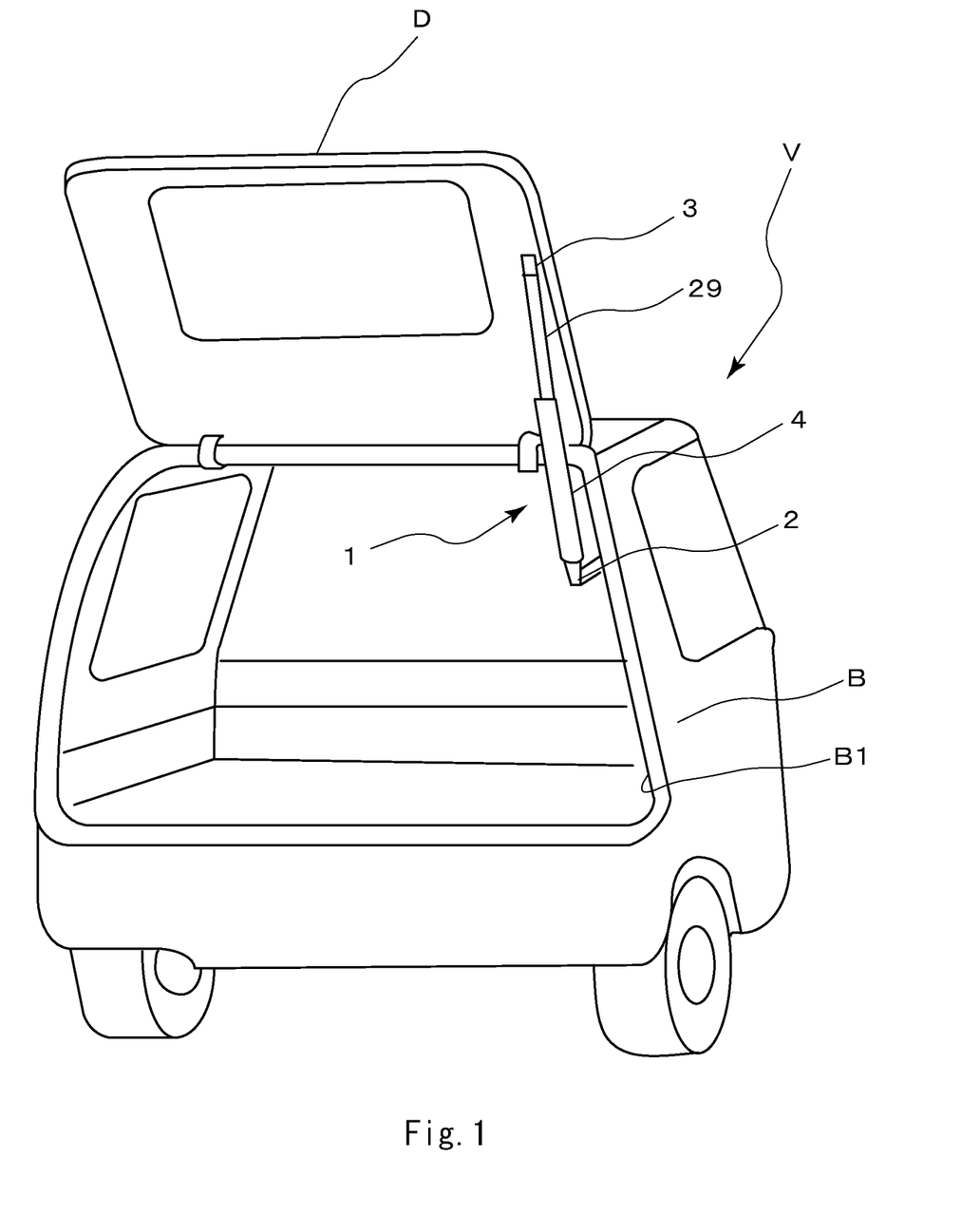
FIG. 1 is a schematic perspective view illustrating a rear door of a vehicle applied with a vehicle door opening/closing apparatus according to an exemplary embodiment as viewed from the vehicle rear side, illustrating a state in which the rear door has been opened by operating the vehicle door opening/closing apparatus to an extended position.

As illustrated in FIG. 1, a rear door D is provided to a rear end section of a vehicle V. An upper end portion of the rear door D is coupled to a body B (a vehicle body) of the vehicle V so as to be capable of pivoting, with an axial direction of the upper end portion of the rear door D running along a vehicle width direction. The rear door D is thereby configured capable of opening and closing a door opening B1 of the vehicle V. The door opening/closing apparatus 1 is formed as whole with a substantially elongated circular column shape. One axial direction end portion (a base end portion) of the door opening/closing apparatus 1 is connected to the body B (more specifically, to a side portion on the vehicle right side of the door opening B1) by a first inclined connection portion 2, and another axial direction end portion (a leading end portion) of the door opening/closing apparatus 1 is connected to a right end portion on a vehicle cabin inner side of the rear door D by a second inclined connection portion 3. Operation of the door opening/closing apparatus 1 causes the rear door D to open or close the door opening B1.

Vehicle Door Opening/Closing Apparatus Configuration

Figure 2:
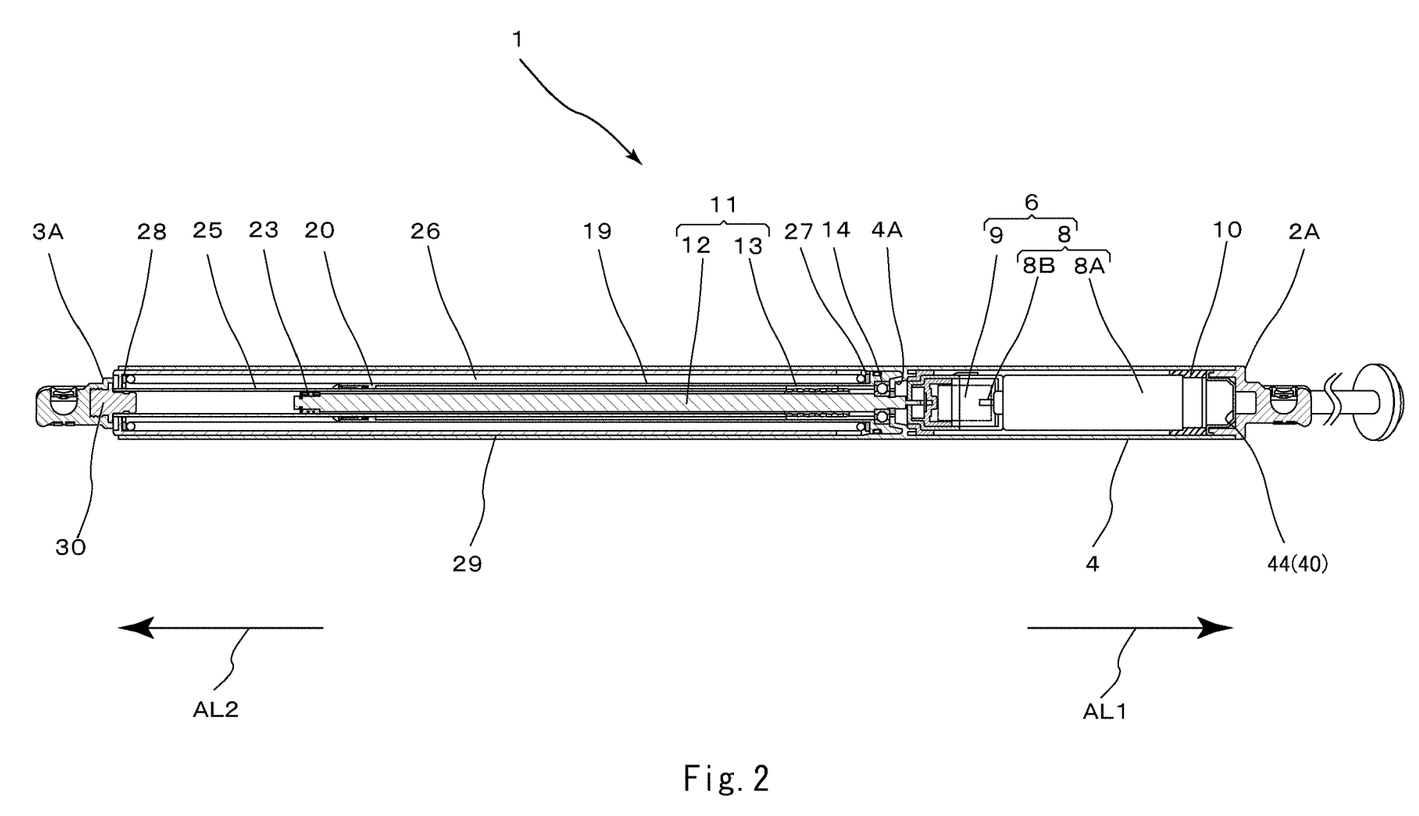
FIG. 2 is a longitudinal cross-section of the vehicle door opening/closing apparatus in FIG. 1, illustrating a state in which the vehicle door opening/closing apparatus is disposed at a contracted position (initial position).

As illustrated in FIG. 2, the door opening/closing apparatus 1 is formed in a substantially elongated circular column shape overall. The arrow AL1 side in FIG. 2 indicates one axial direction side (a base end side) of the door opening/closing apparatus 1, and the arrow AL2 side in FIG. 2 indicates another axial direction side (a leading end side) of the door opening/closing apparatus 1.

The door opening/closing apparatus 1 includes a main housing 4 serving as a "first housing" configuring an outer casing of the door opening/closing apparatus 1. The main housing 4 is made of resin, and is formed in a substantially circular tube shape. A first ball socket 2A, described later, is bonded to one axial direction end portion of the main housing 4 by laser welding. The main housing 4 is configured from a resin material colored so that the laser used when laser welding the first ball socket 2A passes through without being absorbed. Although in the explanation of the present exemplary embodiment black is employed for coloration to absorb the laser and not allow the laser to pass through, and a color other than black is employed for coloration to allow the laser to pass through without being absorbed, coloration is not limited to the above, and may be modified according to the wavelength of the laser.

The door opening/closing apparatus 1 also includes a spring cover 29 serving as a "second housing". The spring cover 29 is formed substantially in the shape of a bottomed circular tube open toward the one axial direction side of the door opening/closing apparatus 1. The diameter of the spring cover 29 is set smaller than the diameter of the main housing 4, and the spring cover 29 is disposed coaxially with the main housing 4 and housed inside the main housing 4 so as to be capable of moving relative to the main housing 4. Note that the housed state of the spring cover 29 illustrated in FIG. 2 is the initial state of the door opening/closing apparatus 1, and in the following explanation, the position of the door opening/closing apparatus 1 when in this state is referred to as the "contracted position (initial position)". The spring cover 29 moves along the axial direction relative to the main housing 4 when the door opening/closing apparatus 1 is operated such that the door opening/closing apparatus 1 (i.e. the total length direction length thereof) is extended or contracted.

The one axial direction end portion of the main housing 4 is provided with the resin first ball socket 2A, serving as a "ball socket" and configuring part of the first inclined connection portion 2, mentioned above. The first ball socket 2A is fixed to the one axial direction end portion of the main housing 4. The one axial direction end portion of the main housing 4 is thereby coupled to the body B through the first ball socket 2A. Namely, the first ball socket 2A fits together with a spherical fitting portion (for example the spherical head of a ball stud), not illustrated in the drawings, provided on the body B side so as to configure a pivot point of a pivot coupling. Configuration of the first ball socket 2A will be described later.

A resin second ball socket 3A is provided on the other axial direction side of the spring cover 29. The second ball socket 3A configures part of the second inclined connection portion 3 mentioned above. A ball socket push rod 30 is integrally formed to the second ball socket 3A by insert molding. The ball socket push rod 30 passes through another axial direction end portion (a leading end portion) of the spring cover 29, and is fixed by swaging to a push rod 25, described later. Moreover, the second ball socket 3A is coupled to the other axial direction end portion (the leading end portion) of the spring cover 29 so as to be incapable of moving relative thereto due to biasing force of an assist spring 26, described later. The push rod 25, described later, and the other axial direction end portion of the spring cover 29 are thereby coupled to the rear door D through the second ball socket 3A.

An internal wall 4A that partitions an internal space of the main housing 4 in the axial direction is integrally provided on the one axial direction side inside the main housing 4. The internal wall 4A is formed with a plate thickness direction along the axial direction of the main housing 4. An electric motor drive mechanism 6 is housed inside the main housing 4 in an internal space on the one axial direction side of the internal wall 4A. The electric motor drive mechanism 6 is configured including an electric motor 8 (an element which may be understood to be a more broadly defined "drive section") and a transmission mechanism 9.

The electric motor 8 includes a substantially circular column shaped motor body 8A. The motor body 8A is disposed coaxially with the main housing 4. A motor retainer 10 is mounted to one axial direction end portion of the motor body 8A, such that a motor terminal (not illustrated in the drawings) of the electric motor 8 is retained by the motor retainer 10. The electric motor 8 is housed inside the main housing 4 in a state in which rattling of the motor body 8A in a radial direction is suppressed by the motor retainer 10. Moreover, a boot portion 44 of a grommet 40 is provided on the one axial direction side of the motor retainer 10. Explanation regarding configuration of the grommet 40 will be given later.

A rotation shaft 8B of the electric motor 8 projects toward the other axial direction side with respect to the motor body 8A. The transmission mechanism 9 is coupled to the rotation shaft 8B in order to transmit rotation force of the electric motor 8 to a threaded spindle 12, described later. The transmission mechanism 9 includes a gearbox configured with a gear mechanism, an oscillating mechanism to prevent noise, and the like. Note that the transmission mechanism 9, the electric motor 8, the motor retainer 10, and the boot portion 44 are housed in the main housing 4 so as not to rattle in the axial direction of the main housing 4 due to the presence of the internal wall 4A and the first ball socket 2A as described above.

The spring cover 29 described above and a spindle drive mechanism 11 are housed in the main housing 4, inside a space on the other axial direction side of the internal wall 4A. The spindle drive mechanism 11 is configured including the threaded spindle 12, a push-rod nut 13, a push-rod guide 19, a spindle rotor 23, and the push rod 25.

Figure 3:
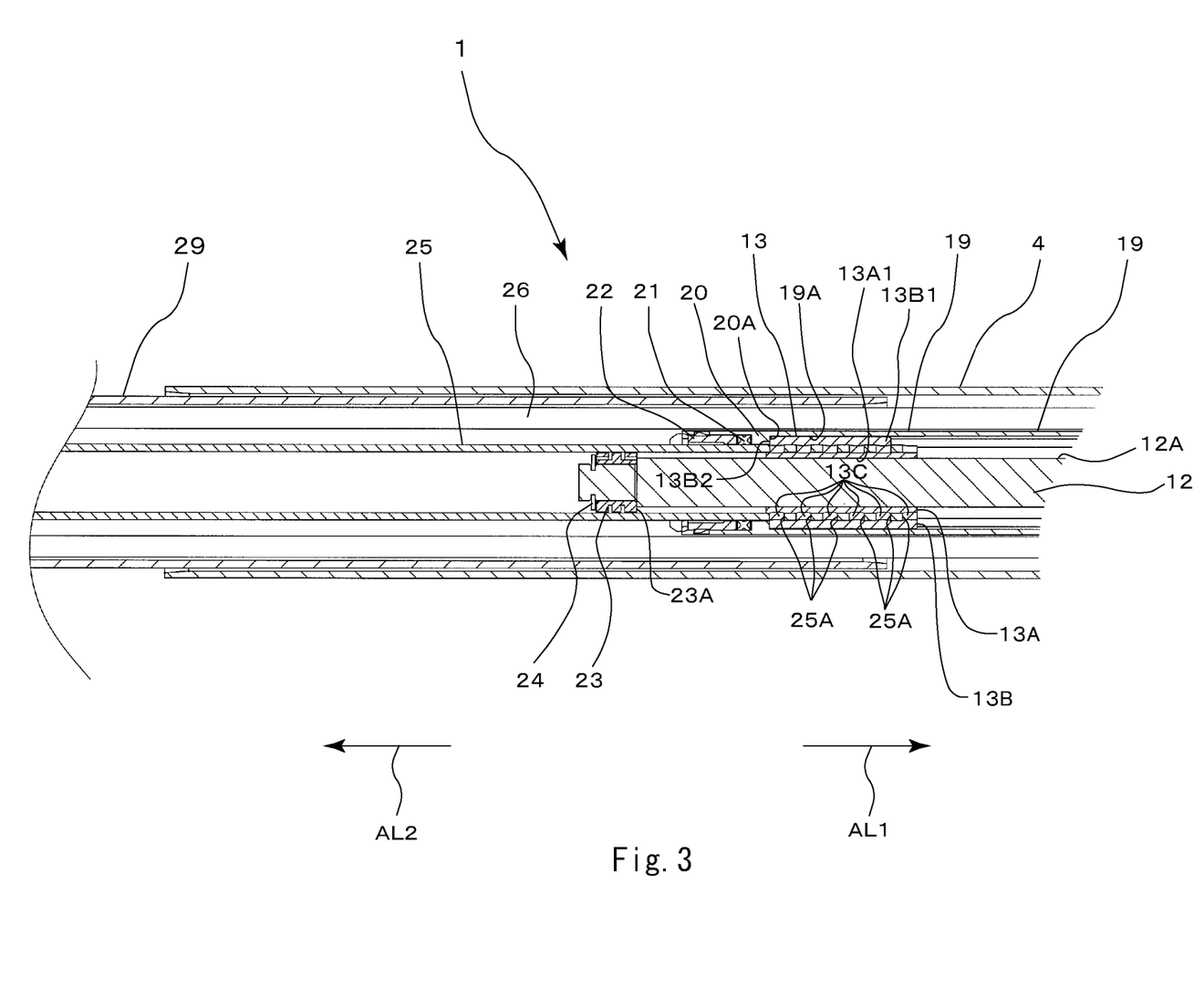
FIG. 3 is an enlarged longitudinal cross-section illustrating the vicinity of a stopper in a state in which the vehicle door opening/closing apparatus in FIG. 2 has been operated to an extended position.

The threaded spindle 12 is configured by a metal material (for example, a steel material), and is formed in a substantially elongated circular rod shape with its length direction running in the axial direction of the main housing 4. The threaded spindle 12 is disposed coaxially with the main housing 4. One axial direction side portion of the threaded spindle 12 is fixed to an inside portion of a ball bearing 14 by swaging, and is rotatably supported by the ball bearing 14. The ball bearing 14 is disposed adjacent to the internal wall 4A of the main housing 4 so as to be on the other axial direction side thereof, and is fixed to the main housing 4. Moreover, one axial direction end portion of the threaded spindle 12 is coupled to the transmission mechanism 9 of the electric motor drive mechanism 6 described above. Accordingly, the threaded spindle 12 is rotated toward one side or the other side about its own axis by operation of the electric motor 8 (forward rotation or reverse rotation of the rotation shaft 8B). Moreover, as illustrated in FIG. 3, a male threaded portion 12A is configured by an outer circumferential portion of a length direction intermediate portion of the threaded spindle 12 (specifically, by a portion of the threaded spindle 12 excluding the one axial direction end portion (a base end portion) and another axial direction end portion (a leading end portion) thereof). A thread is formed on the male threaded portion 12A. Accordingly, a "leading end portion of the threaded spindle 12" of the present exemplary embodiment refers to a portion on a leading end side portion of the threaded spindle 12 where the male threaded portion 12A is not formed.

As illustrated in FIG. 2 and FIG. 3, the push rod 25 is formed in a circular pipe shape, and is disposed coaxially with the spring cover 29. Moreover, the diameter of the push rod 25 is set smaller than the diameter of the spring cover 29, and set larger than the diameter of the threaded spindle 12. Namely, the push rod 25 is housed inside the spring cover 29, and the threaded spindle 12 is housed inside the push rod 25. Note that the ball socket push rod 30 is fixed to another axial direction end portion of the push rod 25 by swaging as described above, such that the push rod 25 and the spring cover 29 move together as a unit.

The push-rod nut 13 is configured from a resin material, and is integrally formed to one axial direction end portion of the push rod 25 by insert molding. Specifically, as illustrated in FIG. 3, the push-rod nut 13 is configured including a nut inner portion 13A integrally formed to an inner circumferential face of the push rod 25 and provided at a radial direction inside of the push rod 25, and a nut outer portion 13B that is integrally formed to an outer circumferential face of the push rod 25 and provided at a radial direction outside of the push rod 25. The push-rod nut 13 includes plural coupling portions 13C to couple the nut inner portion 13A and the nut outer portion 13B together. The coupling portions 13C are inserted through insert molding holes 25A formed in the push rod 25.

The nut inner portion 13A is formed in a circular tube shape. An inner circumferential face of the nut inner portion 13A is configured by a female threaded portion 13A1. The female threaded portion 13A1 is formed with a thread that meshes with the male threaded portion 12A of the threaded spindle 12. The push-rod nut 13 and the threaded spindle 12 are screw together in this manner.

The nut outer portion 13B is formed in a circular tube shape. An outer circumferential portion of the nut outer portion 13B is provided with plural guide projections 13B1 projecting toward the radial direction outside and extending along the axial direction of the push rod 25. The guide projections 13B1 are disposed at predetermined spacings around the circumferential direction of the nut outer portion 13B. Namely, an outer circumferential face of the nut outer portion 13B is formed with a corrugated profile (spline shape) as viewed along the axial direction of the push rod 25. Moreover, a leading end face of the nut outer portion 13B configures an abutted face 13B2. The abutted face 13B2 is disposed in a plane orthogonal to the axial direction of the push rod 25.

As illustrated in FIG. 2, the push-rod guide 19 is formed in a circular tube shape from resin, and is disposed coaxially with the push rod 25. Specifically, the push-rod guide 19 is disposed at the radial direction outside of the push rod 25 and at the radial direction inside of the spring cover 29. One axial direction end portion of the push-rod guide 19 is formed with a flange shape projecting toward the radial direction outside, and is disposed adjacent to the ball bearing 14 so as to be on the other axial direction side thereof and fixed to the main housing 4 by laser welding. As illustrated in FIG. 3, another axial direction end (a leading end) of the push-rod guide 19 is disposed on the one axial direction side (the base end side) of another axial direction end (a leading end) of the threaded spindle 12. Namely, the other axial direction end portion (the leading end portion) of the threaded spindle 12 is disposed at a separation toward the other axial direction end side with respect to (the leading end of) the push-rod guide 19.

An inner circumferential face of the push-rod guide 19 is formed with a corrugated profile corresponding to an outer circumferential face of the push-rod nut 13 (the nut outer portion 13B). In other words, the inner circumferential face of the push-rod guide 19 is provided with plural guide recesses 19A that engage with the guide projections 13B1 and extend along the axial direction. The outer circumferential face of the push-rod nut 13 (the nut outer portion 13B) is fitted (spline-fitted) together with the inner circumferential face of the push-rod guide 19, such that the push-rod nut 13 is not capable of rotating relative to the push-rod guide 19 but is capable of moving (sliding) in the axial direction relative to the push-rod guide 19. Namely, a clearance is formed between the outer circumferential face of the push-rod nut 13 (the nut outer portion 13B) and the inner circumferential face of the push-rod guide 19 so as to enable the push-rod nut 13 to slide with respect to the push-rod guide 19. Accordingly, setting is made such that when the threaded spindle 12 is rotated toward the one side about its axis driven by the electric motor 8, the push-rod nut 13 (the push rod 25) is guided by the push-rod guide 19 and moves toward the other axial direction side (the leading end side, the arrow AL2 side in FIG. 3) from the contracted position so as to be disposed at an extended position (the position illustrated in FIG. 3). Setting is also made such that when the threaded spindle 12 is rotated toward the other side about its axis, the push-rod nut 13 (the push rod 25) is guided by the push-rod guide 19 and moves toward the one axial direction side (the base end side, the arrow AL1 side in FIG. 3) from the extended position so as to be disposed at the contracted position.

Moreover, as illustrated in FIG. 2, the assist spring 26 configured by a compression coil spring is provided at the radial direction outside of the push-rod guide 19. The assist spring 26 is housed inside the spring cover 29. In other words, the push-rod guide 19 is disposed at the radial direction inside of the assist spring 26. One end portion of the assist spring 26 is anchored to the ball bearing 14 through a first spring rotation washer 27, and another end portion of the assist spring 26 is anchored to the other axial direction end portion (the leading end portion) of the spring cover 29 through a second spring rotation washer 28. The biasing force or the assist spring 26 accordingly acts on the push rod 25 through the spring cover 29 and the ball socket push rod 30 so as to bias the push rod 25 toward e leading end side. Note that the natural length of the assist spring 26 is set such that the assist spring 26 is in a compression-deformed state even in a state in which the spring cover 29 has reached the extended position.

Moreover, the spring constant of the assist spring 26 is set such that when, in a non-operated state of the electric motor drive mechanism 6, the rear door D has been placed at a partially open position by a manual operation or the like, the rear door D is maintained in the partially open state without opening as far as an open position due to frictional force acting in a direction against the assist spring 26 (for example, frictional force of a spindle drive device, a transmission unit, or a brake device). However, the force required to drive the electric motor drive mechanism 6 is a comparatively small force due to the opening operation of the rear door D being aided by the biasing force of the assist spring 26.

As illustrated in FIG. 3, the other axial direction end portion of the push-rod guide 19 is integrally formed with a stopper 20. The stopper 20 projects toward the radial direction inside of the push-rod guide 19, and is formed around the entire circumferential direction of the push-rod guide 19. Namely, the stopper 20 is formed in an annular shape (a ring shape), and is provided integrally to the inner circumferential face of the push-rod guide 19. The stopper 20 has a substantially rectangular cross-section profile as viewed along the circumferential direction, and a base end side (the arrow AL1 side) face of the stopper 20 configures an abutting face 20A. Namely, the abutting face 20A is disposed in a plane orthogonal to the axial direction of the push-rod guide 19, and is disposed opposing the abutted face 13B2 of the push-rod nut 13 (the nut outer portion 13B) in the axial direction. When the push-rod nut 13 moves toward the other axial direction side and reaches the extended position by being driven by the electric motor drive mechanism 6, the abutted face 13B2 of the push-rod nut 13 abuts the abutting face 20A of the stopper 20 face-to-face, thereby limiting (restricting) movement of the push-rod nut 13 (namely, the push rod 25) toward the other axial direction side.

The spindle rotor 23 is made of resin, is formed in a substantially circular tube shape, and is fixed to a leading end portion of the threaded spindle 12 so as to be capable of rotating as an integral unit therewith. The external diameter of the spindle rotor 23 is set slightly smaller than the internal diameter of the push rod 25, such that a clearance is formed between the spindle rotor 23 and the push rod 25 that allows an outer circumferential face of the spindle rotor 23 to rotate while sliding over the inner circumferential face of the push rod 25. A leading end side of the spindle rotor 23 is provided with an E-ring 24 that is anchored to the threaded spindle 12. The spindle rotor 23 is prevented from detaching from the leading end side of the threaded spindle 12 by the E-ring 24.

The spindle rotor 23 is disposed so as to be located at a separation from the stopper 20 toward the leading end side of the threaded spindle 12. Specifically, when the push rod 25 is at the extended position, the abutted face 13B2 of the push-rod nut 13 and a base-end face 23A (an end face on the arrow AL1 side) of the spindle rotor 23 are disposed with a predetermined separation therebetween.

An X-ring 21 is provided at the radial direction outside of the push rod 25 so as to be located on the opposite side of the stopper 20 to the abutting face 20A (more specifically, between the stopper 20 and the spindle rotor 23). The X-ring 21 is elastic and is formed in a substantially annular shape (ring shape), and is formed with an X-shaped cross-section profile as viewed along a circumferential direction of the X-ring 21. The X-ring 21 is disposed in a compression-deformed state between the outer circumferential face of the push rod 25 and the inner circumferential face of the push-rod guide 19. Namely, the X-ring 21 is disposed in a state making close contact with the outer circumferential face of the push rod 25 and the inner circumferential face of the push-rod guide 19. Together with the spindle rotor 23, the X-ring 21 thereby suppresses rattling of the push rod 25 in the radial direction. Note that a push rod retainer 22 is provided to the X-ring 21 so as to be located at the leading end side of the push-rod guide 19. The push rod retainer 22 is a member that prevents the X-ring 21 from detaching from the leading end side of the push-rod guide 19.

Next, explanation follows regarding the first ball socket 2A and the grommet 40, these being relevant portions of the present invention.

Figure 4:
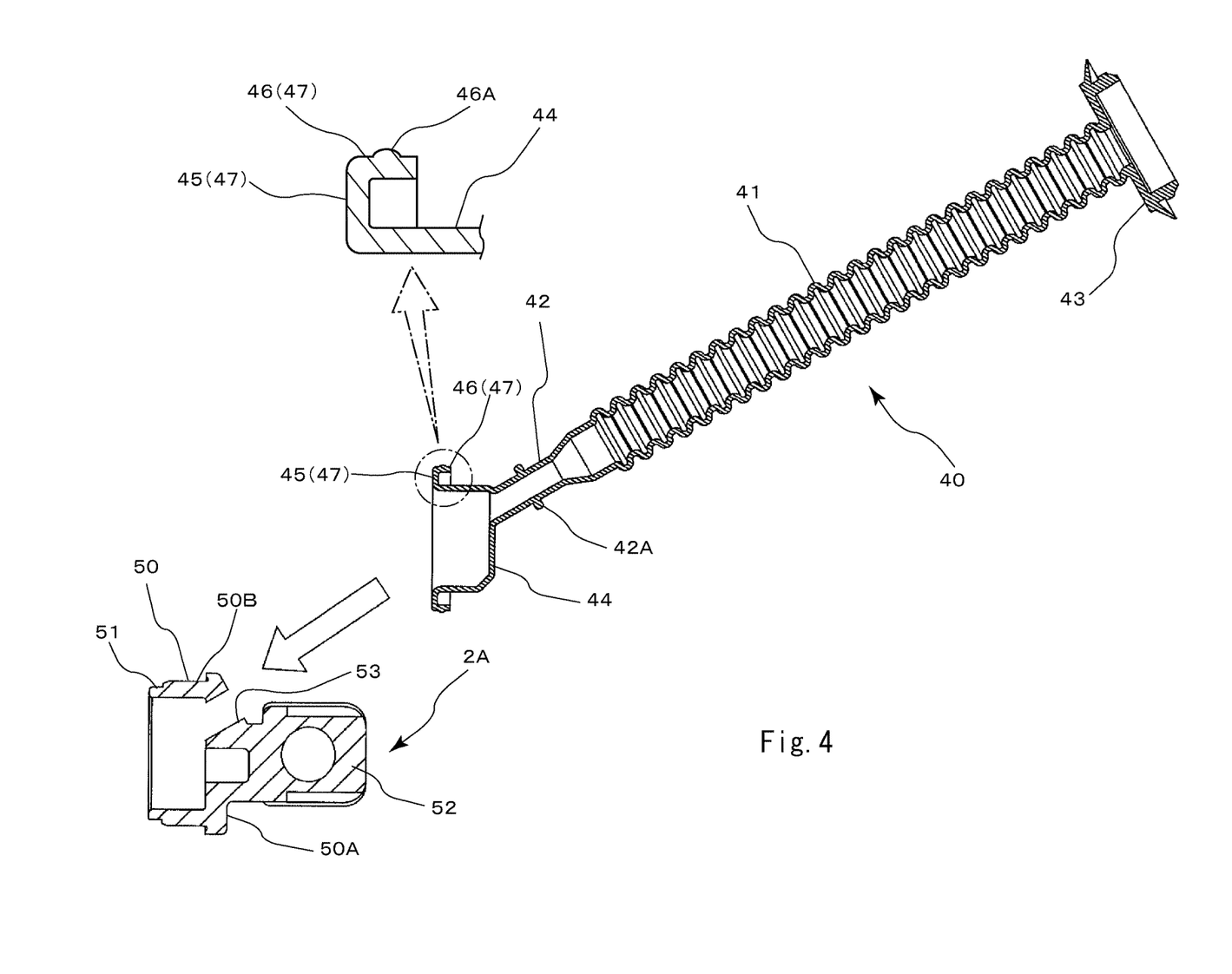
FIG. 4 is a cross-section illustrating a state in which a grommet illustrated in FIG. 2 has been detached from a first ball socket.
Figure 5:
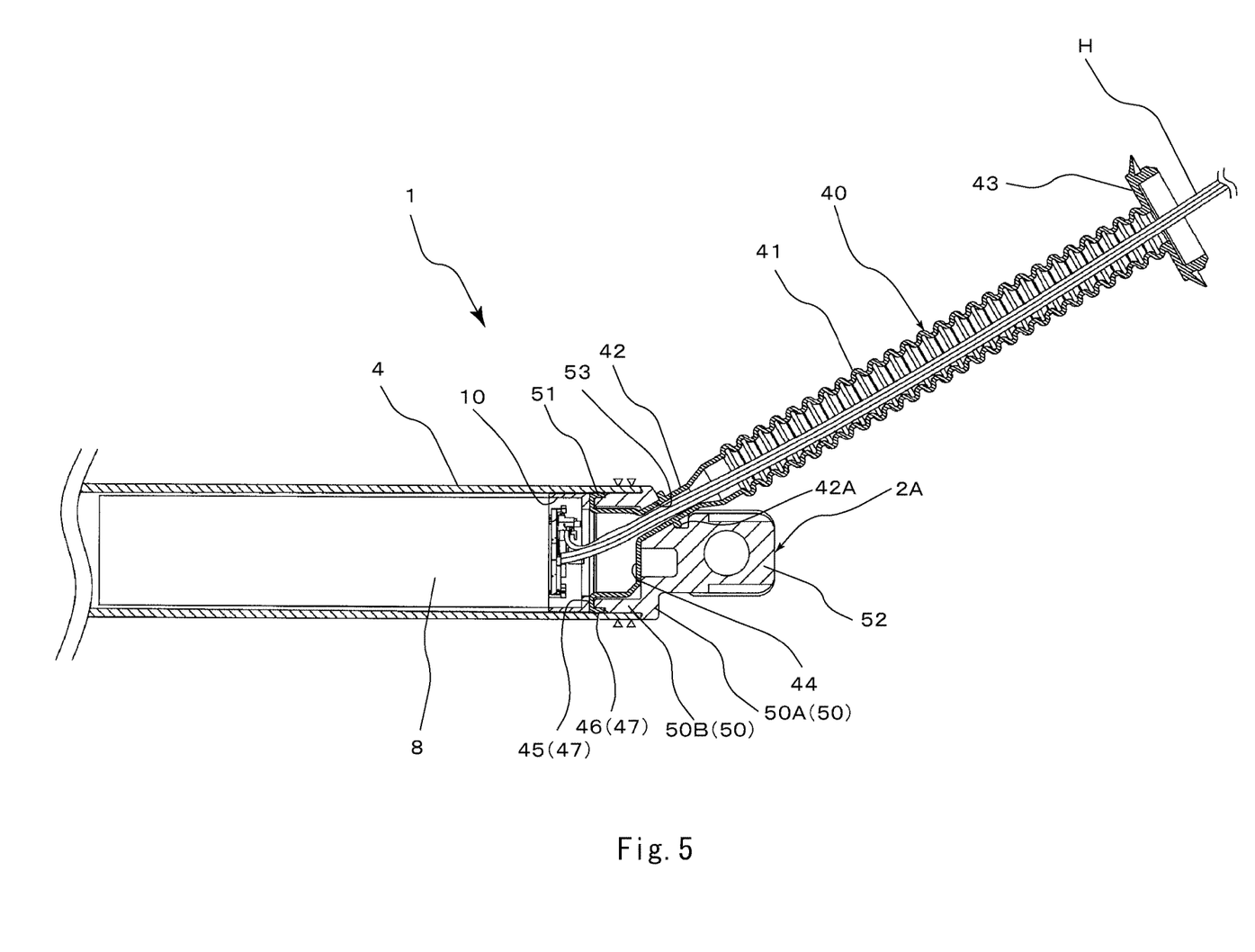
FIG. 5 is an enlarged cross-section illustrating a state in which the grommet and the first ball socket illustrated in FIG. 2 have been assembled to a main housing.
Figure 6A:
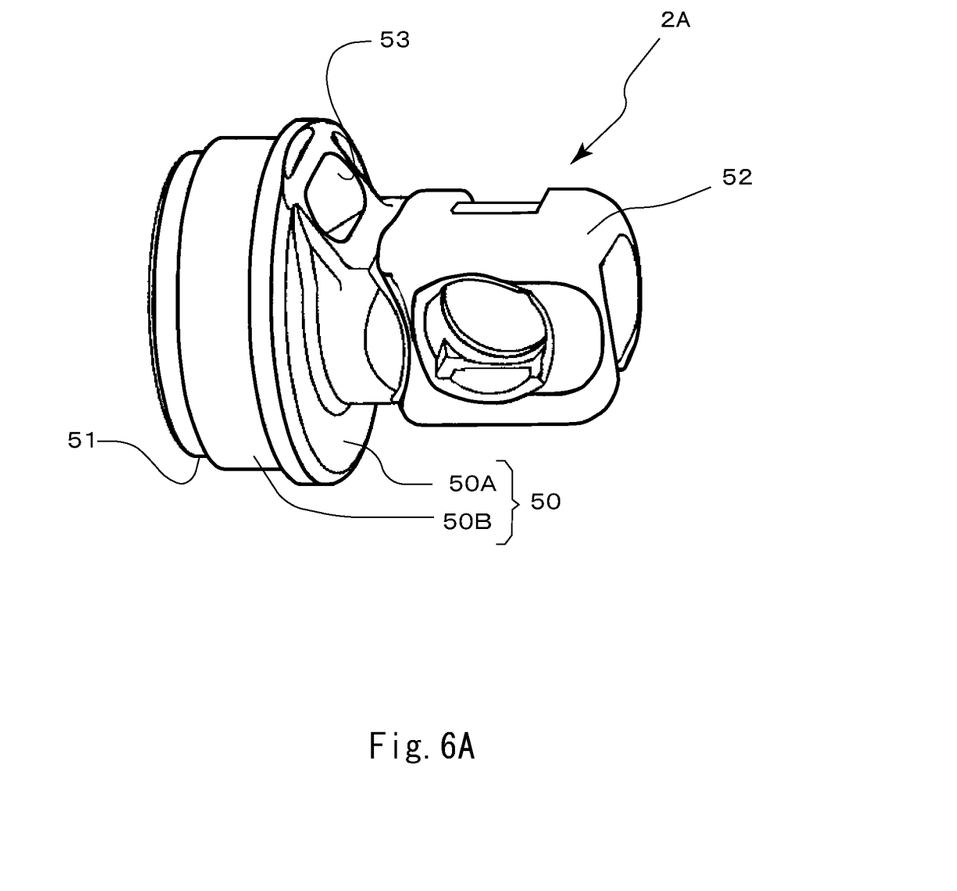
FIG. 6A is a perspective view of the first ball socket illustrated in FIG. 2.

As illustrated in FIG. 4, FIG. 5, and FIG. 6A, the first ball socket 2A includes a cap 50 formed in a bottomed, substantially circular tube shape. Specifically, the cap 50 is configured including a lid portion 50A serving as a substantially circular disc shaped "bottom portion" with a plate thickness direction running in the axial direction of the main housing 4, and a substantially circular tube shaped fitting tube portion 50B projecting from an outer circumferential portion of the lid portion 50A toward the leading end side of the main housing 4. The external diameter of the fitting tube portion 50B is set smaller than the external diameter of the lid portion 50A, and is set substantially the same as the internal diameter of the main housing 4. The fitting tube portion 50B is fitted inside the one axial direction end portion of the main housing 4, such that the one axial direction end portion of the main housing 4 is closed off by the lid portion 50A (see FIG. 5).

The first ball socket 2A is fixed (bonded) to the one axial direction end portion of the main housing 4 by laser welding at the location of the fitting tube portion 50B. The first ball socket 2A is accordingly configured from a resin that has been colored black, such that the laser employed when laser welding does not pass through and as absorbed. An inner circumferential face of the main housing 4 and an outer circumferential face of the fitting tube portion 50B are joined together by laser welding to form a join portion between the main housing 4 and the fitting tube portion 50B around the entire circumferential direction of the main housing 4. Namely, the main housing 4 and the fitting tube portion 50B are joined together around the entire circumferential direction of the main housing 4.

A step 51 that opens toward the radial direction outside and leading end side of the fitting tube portion 50B is formed in an outer circumferential portion of a leading end portion of the fitting tube portion 50B. Namely, the leading end portion of the fitting tube portion 50B is set with a smaller diameter than other portions of the fitting tube portion 50B. This setting accordingly means that in a joined state of the main housing 4 and the fitting tube portion 50B there is a gap formed between the leading end portion (the step 51) of the fitting tube portion 50B and the main housing 4.

A socket 52 is formed projecting toward the opposite side of the fitting tube portion 50B (toward the one axial direction side of the main housing 4) to the lid portion 50A at a substantially central portion of the lid portion 50. The lid portion 50A is also formed with a harness insertion hole 53 passing through the lid portion 50A, such that the inside and the outside of the cap 50 are placed in communication with each other by the harness insertion hole 53. The harness insertion hole 53 is inclined toward the radial direction outside on progression toward the one axial direction side, and the harness insertion hole 53 and the socket 52 are disposed such that they do not impinge on each other. A harness H that is connected to the motor terminal of the electric motor 8 is disposed inside the harness insertion hole 53 such that the harness H is led out.

Figure 6B:
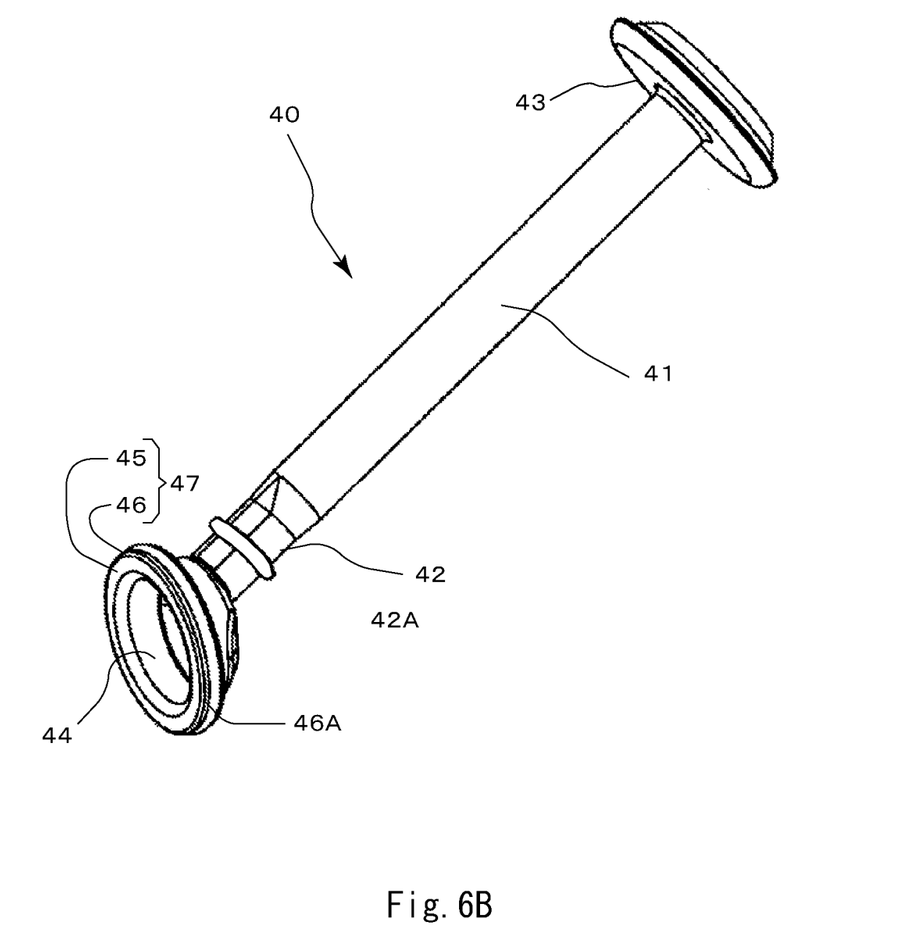
FIG. 6B is a perspective view of the grommet illustrated in FIG. 2.

As illustrated in FIG. 4, FIG. 5, and FIG. 6B, the grommet 40 is configured from an elastic material such as rubber. The grommet 40 configures a substantially elongated hollow structure, and extends from the harness insertion hole 53 in the first ball socket 2A toward the outside along the penetration direction of the harness insertion hole 53. The grommet 40 is thereby disposed inclined toward the radial direction outside on progression from the first ball socket 2A toward the one axial direction side of the door opening/closing apparatus 1, and is disposed so as not to impinge on the socket 52. The grommet 40 as configured including a harness cover portion 41 serving as a "cover portion", a coupling tube portion 42, the boot portion 44, a retainer portion 45, and a packing portion 46.

The harness cover portion 41 configures a length direction intermediate portion of the grommet 40, and is formed in a substantially circular tube shape. The harness H that has been led out through the harness insertion hole 53 is disposed inside the harness cover portion 41 (see FIG. 5). An outer circumferential portion of the harness cover portion 41 is formed with a concertina profile so as to be capable of extending and contracting within a predetermined range in the length direction of the harness cover portion 41 (in FIG. 6B, the outer circumferential portion of the harness cover portion 41 is simplified for convenience).

An end portion on the first ball socket 2A side of the harness cover portion 41 is connected to the substantially circular tube shaped coupling tube portion 42. The external diameter dimension of the coupling tube portion 42 is set substantially the same as the internal diameter dimension of the harness insertion hole 53, and the coupling tube portion 42 is fitted into the harness insertion hole 53. A flange 42A is integrally formed to an outer circumferential portion of the coupling tube portion 42 so as to project toward the radial direction outside. The flange 42A is disposed so as to block off an opening on the outside of the harness insertion hole 53 (on an outer peripheral face side of the cap 50) (see FIG. 5).

An end portion of the harness cover portion 41 on the opposite side to the first ball socket 2A is integrally formed with a grommet portion 43. The grommet portion 43 is attached to, for example, the body B or the door opening B1 of the vehicle V. Note that the harness H is provided with an external connector, not illustrated in the drawings, and is connected to an internal connector, not illustrated in the drawings, inside the vehicle V.

The boot portion 44 is disposed inside the cap 50 (at the radial direction inside of the fitting tube portion 50B), and is formed in a bottomed, substantially circular tube shape that opens toward the leading end side of the main housing 4, similarly to the cap 50. The boot portion 44 is set with a shape corresponding to an inner circumferential face of the cap 50, and the boot portion 44 is disposed so as to follow the inner circumferential face of the cap 50. The external diameter of the boot portion 44 is thus set so as to be much larger than the internal diameter of the harness insertion hole 53. An end portion of the coupling tube portion 42 is connected to a bottom wall of the boot portion 44, and the inside of the boot portion 44 and the inside of the harness cover portion 41 are placed in communication with each other through the coupling tube portion 42. Namely, the harness H that has been led out from the electric motor 8 is covered by the boot portion 44, and is inserted into the coupling tube portion 42.

The retainer portion 45 extends from a leading end portion (opening end portion) of the boot portion 44 toward the radial direction outside, and is disposed adjacent to a leading end face (opening end face) of the fitting tube portion 50B of the cap 50. Namely, the retainer portion 45 is formed in a substantially annular plate shape (ring shape) with a plate thickness direction running along the axial direction of the boot portion 44. The retainer portion 45 is disposed in a state sandwiched between the motor retainer 10 and the first ball socket 2A (the fitting tube portion 50B).

The packing portion 46 extends from a radial direction outside end portion of the retainer portion 45 toward the bottom wall side of the boot portion 44, and is disposed in the step 51 of the cap 50 (the fitting tube portion 50B) described above. In other words, the packing portion 46 is configured so as to encircle a leading end portion of the cap 50 (the fitting tube portion 50B) from the radial direction outside. A folded-back flange portion is accordingly formed by the retainer portion 45 and the packing portion 46 at the radial direction outside of the opening end portion of the boot portion 44. The flange portion configures a detachment prevention section 47. Namely, the leading end portion of the cap 50 (the fitting tube portion 50B) is covered by the detachment prevention section 47. Thus, if the boot portion 44 attempts to move toward the one axial direction side, the detachment prevention section 47 engages with the leading end portion of the cap 50 (the fitting tube portion 50B) so as to limit the movement of the boot portion 44 toward the one axial direction side. Namely, the detachment prevention section 47 is configured to prevent or suppress the boot portion 44 from being pulled out through the harness insertion hole 53 in the first ball socket 2A.

The thickness of the packing portion 46 is set so as to fill the gap between the main housing 4 and the step 51 in a state in which the packing portion 46 is disposed in the step 51. Namely, the thickness of the packing portion 46 is set such that the packing portion 46 is sandwiched between the main housing 4 and the step 51. Moreover, a sealing projection 46A (see the enlarged partial view of FIG. 4) is integrally formed to a radial direction outside face of the packing portion 46 so as to project toward the radial direction outside. The sealing projection 46A is formed around the entire circumferential direction of the packing portion 46. In a state in which the packing portion 46 is disposed in the step 51, the sealing projection 46A is pressed by the inner circumferential face of the main housing 4 so as to be deformed in compression. In this manner, the sealing projection 46A raises the closeness of contact between the main housing 4 and the packing portion 46, and between the step 51 and the packing portion 46.

Operation and Advantageous Effects

Next, explanation follows regarding operation and advantageous effects of the present exemplary embodiment, with reference to operation of the door opening/closing apparatus 1, and a procedure for assembly of the first ball socket 2A and the grommet 40 to the main housing 4.

Operation of Door Opening/Closing Apparatus

Explanation follows regarding operation of the door opening/closing apparatus 1. For the door opening/closing apparatus 1, the state illustrated in FIG. 2 is a state in which the door opening/closing apparatus 1 in the initial state, and the door opening/closing apparatus 1 is disposed at the contracted position (the initial position). When the door opening/closing apparatus 1 is at the contracted position (the initial position), the rear door D of the vehicle V is closed, and the assist spring 26 is subject to the maximum prestress (compression stress).

When opening the rear door D of the vehicle V, the electric motor drive mechanism 6 is actuated (operated) using a door switch or the like, not illustrated in the drawings, so as to drive rotation of the threaded spindle 12. Specifically, when the threaded spindle 12 rotates toward the one side about its own axis driven by the electric motor 8, the push-rod nut 13 meshed with the male threaded portion 12A of the threaded spindle 12 moves toward the leading end side following the guide recesses 19A in the push-rod guide 19. Accordingly, the push rod 25 and the spring cover 29 move, together with the push-rod nut 13, toward the leading end side of the push-rod guide 19. Namely, the spring cover 29 extends from the main housing 4 so as to increase the overall length of the door opening/closing apparatus 1.

When this is performed, the assist spring 26 aids (assists) driving to open the rear door D by biasing the spring cover 29 toward the other axial direction side (the leading end side). The operation to open the rear door D to the open position is continued until the rear door D is determined to have reached the open position based on the number of revolutions of the electric motor drive mechanism 6, or on position as detected using a stroke sensor such as a Hall sensor or a limit switch. The operation of the electric motor drive mechanism 6 is stopped at this point. When the spring cover 29 extends from the main housing 4, the spring cover 29 is positioned so as to surround the periphery of the assist spring 26, thereby preventing radial direction buckling of the assist spring 26.

When closing the rear door D from the open position, the electric motor drive mechanism 6 is actuated (operated) to drive rotation of the threaded spindle 12. Specifically, when the threaded spindle 12 is rotated toward the other side about its own axis by being driven by the electric motor 8, the push-rod nut 13 meshed with the male threaded portion 12A of the threaded spindle 12 moves toward the base end side following the guide recesses 19A in the push-rod guide 19. Accordingly, the push rod 25 and the spring cover 29 move toward the base end side of the push-rod guide 19 together with the push-rod nut 13. Namely, the spring cover 29 retracts into the main housing 4 so as to shorten the overall length of the door opening/closing apparatus 1.

The movement amount of the rear door D to a closed position is determined based on the number of revolutions of the electric motor 8 of the electric motor drive mechanism 6, or is identified by detecting position using a stroke sensor such as a Hall sensor or limit switch. The operation to close the rear door D to the closed position is continued until operation of the electric motor drive mechanism 6 is stopped based on the identified movement amount.

Procedure for Assembling First Ball Socket and Grommet to Main Housing

In the procedure for assembling the first ball socket 2A and the grommet 40 to the main housing 4, first, the grommet 40 is assembled to the first ball socket 2A. Specifically, the boot portion 44 of the grommet 40 is elastically deformed and inserted into the harness insertion hole 53 in the first ball socket 2A from the outside of the cap 50 (see the arrow in FIG. 4). After inserting the boot portion 44 into the cap 50, the boot portion 44 is arranged so as, to be disposed along the inner circumferential face of the cap 50, and to mount the detachment prevention section 47 (the packing portion 46 and the retainer portion 45) so as to cover the leading end portion of the fitting tube portion 50B of the cap 50. The packing portion 46 is thereby disposed in the step 51 of the fitting tube portion 50B, and the grommet 40 is assembled as an integral unit with the first ball socket 2A.

After assembling the grommet 40 to the first ball socket 2A, the harness H is inserted through the inside of the grommet 40. The electric motor 8 is then disposed at the leading end side of the first ball socket 2A, the motor retainer 10 is disposed between the electric motor 8 and the first ball socket 2A, and the harness H is inserted through the inside of the motor retainer 10. The harness H is connected to the motor terminal of the electric motor 8 by soldering while in this state. The motor retainer 10 is then mounted to an end portion of the electric motor 8, and the position of the harness H is adjusted such that the motor retainer 10 is clamped between the electric motor 8 and the first ball socket 2A. The first ball socket 2A and the grommet 40 are thus integrated with the electric motor 8 as a motor-harness assembly.

Then, as illustrated in FIG. 5, the motor-harness assembly is inserted into the main housing 4 from the one axial direction side and assembled to the main housing 4. Specifically, the fitting tube portion 50B of the first ball socket 2A is fitted into an opening end portion of the main housing 4 while the sealing projection 46A of the grommet 40 is pressed toward the radial direction inside by the inner circumferential face of the main housing 4, and the opening end of the main housing 4 is closed off by the lid portion 50A of the first ball socket 2A.

A laser is then shone onto the main housing 4 from the radial direction outside at the outer circumferential face of a fitting portion of the main housing 4 that fits to the fitting tube portion 50B (more specifically, the location illustrated by white triangles in FIG. 5), and the main housing 4 and the fitting tube portion 50B are joined around the entire circumferential direction of the main housing 4. Specifically, the laser passes through the main housing 4 and reaches the outer circumferential face of the fitting tube portion 50B, where the laser is absorbed by the fitting tube portion 50B so as to generate heat and melt the fitting tube portion 50B. The heat generated at the fitting tube portion 50B is also transmitted to the main housing 4 so as to generate heat and melt the main housing 4. The fitting tube portion 50B and the main housing 4 are thus joined at this melted portion. The first ball socket 2A is bonded to the main housing 4 as a result, thereby assembling the motor-harness assembly to the main housing 4.

Note that in the door opening/closing apparatus 1, the grommet 40 includes the boot portion 44 that has a bottomed-tube shape. The boot portion 44 is disposed inside the cap 50 of the first ball socket 2A, and is coupled to the harness cover portion 41 of the grommet 40 by the coupling tube portion 42. Moreover, the leading end portion (opening end portion) of the boot portion 44 is formed with the detachment prevention section 47 configured by the retainer portion 45 and the packing portion 46. The detachment prevention section 47 is folded back on itself at the radial direction outside of the boot portion 44 so as to cover the leading end portion of the fitting tube portion 50B of the cap 50. Accordingly, if the boot portion 44 attempts to move toward the one axial direction side, the detachment prevention section 47 engages with the leading end portion of the fitting tube portion 50B, thereby limiting the movement of the boot portion 44 toward the one axial direction side. As a result, for example, the boot portion 44 can be prevented or suppressed from being pulled out through the harness insertion hole 53 even if the grommet 40 is pulled toward the grommet portion 43 side during assembly of the door opening/closing apparatus 1 to the vehicle V. The grommet 40 can accordingly be prevented or suppressed from detaching from the first ball socket 2A.

Moreover, the packing portion 46 configuring the detachment prevention section 47 is disposed in the step 51 of the first ball socket 2A in a state sandwiched between the main housing 4 and the first ball socket 2A (the fitting tube portion 50B). This enables the detachment prevention effect of the detachment prevention section 47 on the grommet 40 to be further improved.

Moreover, since the packing portion 46 is in a state sandwiched between the main housing 4 and the fitting tube portion 50B of the first ball socket 2A, the packing portion 46 functions as a sealing member that seals between the main housing 4 and the fitting tube portion 50B. This enables the closeness of contact between the main housing 4 and the first ball socket 2A to be improved, and enables the airtight properties inside the main housing 4 to be improved. This enables liquid such as water to be suppressed or prevented from intruding into the main housing 4, even if liquid were to intrude between the main housing 4 and the first ball socket 2A.

As described above, the detachment prevention section 47 configured by the retainer portion 45 and the packing portion 46 is formed in the folded-back flange shape. Amaze-like structure (what is referred to as labyrinth structure) is thus formed between the leading end portion of the fitting tube portion 50B, the detachment prevention section 47, and the boot portion 44. Accordingly, even supposing a liquid such as water were to intrude between the harness insertion hole 53 of the first ball socket 2A and the coupling tube portion 42 of the grommet 40, the liquid can be suppressed from passing between the leading end portion of the fitting tube portion 50B, the detachment prevention section 47, and the boot portion 44 and thereby intruding into the main housing 4. This enables the waterproofing performance of the electric motor 8 to be further improved.

Moreover, the retainer portion 45 configuring the detachment prevention section 47 is disposed in a state sandwiched between the leading end portion of the fitting tube portion 50B and the motor retainer 10. This enables the detachment prevention effect of the detachment prevention section 47 to be even further improved. Moreover, since the grommet 40 is configured by an elastic member, vibration of the electric motor 8 can be absorbed by the retainer portion 45, and vibration of the electric motor 8 can be suppressed from being transmitted to the main housing 4.

Moreover, the fitting tube portion 50B of the first ball socket 2A and the main housing 4 are joined together by laser welding, and the join portion between the two is formed around the entire circumferential direction of the main housing 4. Accordingly, for example, the join strength between the main housing 4 and the first ball socket 2A can be raised in comparison to a comparative example in which a notch opening toward the leading end side of the fitting tube portion 50B is provided in an outer circumferential portion of the fitting tube portion 50B so as to place the outer circumferential portion of the fitting tube portion 50B in communication with the harness insertion hole 53, and in which the coupling tube portion 42 of the grommet 40 is inserted through the notch so as to mount the grommet 40 to the first ball socket 2A. Namely, in the comparative example, due to forming the notch in the fitting tube portion 50B, the join portion between the main housing 4 and the first ball socket 2A (the fitting tube portion 50B) is discontinuous in the circumferential direction of the main housing 4, such that the two cannot be welded together around the entire circumferential direction of the main housing 4. By contrast, in the present exemplary embodiment as described above, the join portion between the fitting tube portion 50B of the first ball socket 2A and the main housing 4 is formed around the entire circumferential direction of the main housing 4, enabling the join strength between the main housing 4 and the first ball socket 2A to be raised in comparison to the comparative example. Moreover, disposing the boot portion 44 inside the cap 50 enables the detachment prevention section 47 to be formed to the boot portion 44, while also enabling laser welding of the fitting tube portion 50B and the main housing 4 to be performed.

The sealing projection 46A projecting toward the radial direction outside is integrally formed to the radial direction outside face of the packing portion 46 of the grommet 40. The sealing projection 46A is deformed in compression due to being pressed by the main housing 4. This enables the closeness of contact between the main housing 4 and the packing portion 46, and the closeness of contact between the fitting tube portion 50B (the cap 50) and the packing portion 46, to be improved by the sealing projection 46A. As a result, the detachment prevention effect of the detachment prevention section 47 on the boot portion 44 can be effectively improved, and the sealing properties between the main housing 4 and the cap 50 (the first ball socket 2A) can also be effectively improved.

Note that although in the present exemplary embodiment the detachment prevention section 47 of the grommet 40 is configured by the retainer portion 45 and the packing portion 46, the configuration of the detachment prevention section. 47 is not limited thereto. For example, a projection may be provided to an opening end face (a leading end face) of the cap 50, and a hole may be provided in the retainer portion 45 for insertion of this projection, such that the projection and the hole engage with each other. In such cases, the packing portion 46 of the detachment prevention section 47 may be omitted and a separate sealing member provided between the main housing 4 and the cap 50.

Moreover, although in the present exemplary embodiment, the laser transmissivity of the first ball socket 2A and the main housing 4 is not particularly specified, the transmissivity with respect to the laser employed may be set at any setting such that the first ball socket 2A and the main housing 4 can be welded together during laser welding.

Detailed explanation has been given regarding an exemplary embodiment of the present invention with reference to the drawings. However, specific configurations are not limited to those of the exemplary embodiment, and include other designs and the like within a range not departing from the spirit of the present invention.

EXPLANATION OF THE REFERENCE NUMERALS 1 door opening/closing apparatus 1
2 first inclined connection portion
2A first ball socket
3 second inclined connection portion
3A second ball socket
4 main housing (first housing)
4A internal wall
5 electric motor drive mechanism
8 electric motor
8A motor body
8B rotation shaft
9 transmission mechanism
10 motor retainer
11 spindle drive mechanism
12 threaded spindle
12A male threaded portion
13 push-rod nut
13A nut inner portion
13A1 female threaded portion
13B nut outer portion (outer edge portion)
13B1 guide projection
13B2 abutted face
13C coupling portion
14 ball bearing
19 push-rod guide
19A guide recess
20 stopper
20A abutting face
21 X-ring
22 push rod retainer
23 spindle rotor
23A base-end face
24 E-ring
25 push rod
25A insert molding hole
26 assist spring
27 first spring rotation washer
28 second spring rotation washer
29 spring cover (second housing)
30 ball socket push rod
40 grommet
41 harness cover portion (cover portion)
42 coupling tube portion
42A flange
43 grommet portion
44 boot portion
45 retainer portion
46 packing portion
46A sealing projection
47 detachment prevention section
50 cap
50A lid portion (bottom portion)
50B fitting tube portion
51 step
52 socket
53 harness insertion hole
B body
B1 door opening
D rear door
H harness
V vehicle

The invention claimed is:

1. A vehicle door opening/closing apparatus comprising:
a tube shaped first housing for housing an electric motor drive mechanism inside, the electric motor drive mechanism including an electric motor;
a second housing that is disposed coaxially with the first housing, and that is moved in an axial direction relative to the first housing by a spindle drive mechanism connected to the electric motor drive mechanism;
a ball socket that includes a cap including a bottomed-tube shape for insertion into an opening on one end side of the first housing to block off the opening, and the ball socket also including a harness insertion hole formed in a bottom portion of the cap to allow a harness connected to the electric motor to be led out; and
a grommet that includes a cover portion extending outside the cap and covering the harness where the harness has been led out of the cap, wherein the grommet includes
a boot portion formed in a bottomed-tube shape opening toward the electric motor side and covering the harness inside the cap,
a coupling tube portion disposed inside the harness insertion hole so as to couple the boot portion and the cover portion together, with the harness inserted through an inside of the coupling tube portion, and
a detachment prevention section formed on the boot portion for engaging with the cap to limit movement of the boot portion toward the harness insertion hole.

2. The vehicle door opening/closing apparatus of claim 1, wherein the detachment prevention section includes:
a retainer portion that extends from an opening end portion of the boot portion toward a radial direction outside so as to be disposed between an opening end face of the cap and the electric motor; and
a packing portion that extends from a radial direction outside end portion of the retainer portion toward a bottom wall side of the boot portion so as to be sandwiched between the first housing and the cap.

3. The vehicle door opening/closing apparatus of claim 1, wherein:
the ball socket is configured from a resin colored so as to absorb a laser;
the first housing is configured from a resin colored so as to allow the laser to pass through without absorbing the laser; and a fitting portion where the ball socket and the first housing are fitted together is bonded by laser welding around an entire circumference of the fitting portion.

4. The vehicle door opening/closing apparatus of claim 1, wherein:

a motor retainer is disposed on the electric motor; and the detachment prevention section is sandwiched between the motor retainer and an opening end face of the cap.

\* \* \* \* \*